United States Patent
Mori et al.

(10) Patent No.: US 12,085,912 B2
(45) Date of Patent: Sep. 10, 2024

(54) INFORMATION PROCESSING APPARATUS, INFORMATION PROCESSING METHOD, AND INFORMATION PROCESSING PROGRAM

(71) Applicant: DMG MORI CO., LTD., Nara (JP)

(72) Inventors: Masahiko Mori, Nara (JP); Naruhiro Irino, Nara (JP); Hironari Sakamoto, Nara (JP); Yoji Tsukui, Hokkaido (JP); Yasuhiro Imabeppu, Nara (JP); Koji Matsuoka, Nara (JP); Munetaka Wakizaka, Nara (JP); Takaaki Soga, Nara (JP); Tetsuo Ogawa, Nara (JP); Takashi Yamamoto, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 267 days.

(21) Appl. No.: 17/623,174

(22) PCT Filed: Jun. 26, 2020

(86) PCT No.: PCT/JP2020/025395
§ 371 (c)(1),
(2) Date: Dec. 27, 2021

(87) PCT Pub. No.: WO2020/262677
PCT Pub. Date: Dec. 30, 2020

(65) Prior Publication Data
US 2022/0260964 A1    Aug. 18, 2022

(30) Foreign Application Priority Data

Jun. 28, 2019 (JP) ................................. 2019-122231
Jun. 9, 2020 (JP) .................................. 2020-100057

(51) Int. Cl.
G05B 19/402 (2006.01)

(52) U.S. Cl.
CPC .. G05B 19/402 (2013.01); *G05B 2219/36489* (2013.01)

(58) Field of Classification Search
CPC .............................. G05B 19/402; G05B 15/02
(Continued)

(56) References Cited

U.S. PATENT DOCUMENTS 9,869,990 B1 * 1/2018 Galavotti ........... G05B 19/4097
2007/0191982 A1   8/2007 Sullivan
(Continued)

FOREIGN PATENT DOCUMENTS

CN       102540974 A       7/2012
CN       109725600 A       5/2019
(Continued)

OTHER PUBLICATIONS

Extended European Search Report mailed Jun. 7, 2022, in European Patent Application No. 20833492.0, 8 pages.
(Continued)

*Primary Examiner* — Ronald D Hartman, Jr.
(74) *Attorney, Agent, or Firm* — DiPerna Law Firm, P.C.

(57) ABSTRACT

There is provided an information processing apparatus for fully utilizing the functions of a machine tool by correctly converting CL data into an NC program. The information processing apparatus includes a CL data acquirer that can acquire CL data including standardization information based on a rule defined among a plurality of output devices, thereby acquiring CL data including the standardization information associated with at least one of unique control information of the numerical control apparatus, unique control information of the machine tool, and unique control information of a user of the machine tool, and an NC program generator that acquires an NC code corresponding to the standardization information included in the CL data, (Continued)

and generates an NC program including the NC code based on the NC code and the CL data.

3 Claims, 10 Drawing Sheets

(58) Field of Classification Search
USPC .......................................................... 700/186
See application file for complete search history.

(56) References Cited

U.S. PATENT DOCUMENTS

| | | | |
|---|---|---|---|
| 2015/0039122 A1* | 2/2015 | Barakchi Fard | G05B 19/19 700/186 |
| 2016/0077516 A1* | 3/2016 | Kojima | G01K 13/00 700/174 |
| 2020/0117163 A1* | 4/2020 | Imanishi | G05B 19/19 |

FOREIGN PATENT DOCUMENTS

| | | | | |
|---|---|---|---|---|
| JP | 62-075810 A | | 4/1987 | |
| JP | 2003140717 A | | 5/2003 | |
| JP | 2008-059518 A | | 3/2008 | |
| JP | 2017134829 A | * | 8/2017 | ......... G05B 19/4093 |
| JP | 6438023 B2 | | 12/2018 | |
| JP | 7274659 B1 | * | 5/2023 | |
| WO | WO-2015013800 A1 | * | 2/2015 | ............. G05B 19/18 |

OTHER PUBLICATIONS

Anonymous, "The Importance of CAM Post-Processors and Their Role in the Development-Production Process—CADCAM Group", retrieved from the Internet <URL: https://www.cadcam-group.eu/en/knowledge/the-importance-of-cam-post-processors-and-their-role-in-the-development-production-process/#:~:text=The%20%post%2Dprocessor%20translates%20CAM,while%20processing%20a%20particular%20part.>, retrieved on May 27, 2022, XP055925515, 10 pages.
International Search Report and Written Opinion dated Sep. 1, 2020 for Application No. PCT/JP2020/025395.
English Abstract of JP 62-075810 A.
English Abstract of 2008-059518 A.
English Abstract of 6438023 B2.
An Office Action issued on Sep. 28, 2023 of Chinese Patent Application No. 202080042847.X.

* cited by examiner

COMMAND OPTION FOR EXPANDING SPECIFICATIONS
CYCLE / DRILL1, [OPT1, string1, [OPT2, string2, [OPT3, string3, ] ... [OPTN, stringN]

FIG. 10

INFORMATION PROCESSING APPARATUS, INFORMATION PROCESSING METHOD, AND INFORMATION PROCESSING PROGRAM

RELATED APPLICATIONS

This application is an application under 35 U.S.C. 371 of International Application No. PCT/JP2020/025395 filed on Jun. 26, 2020, the entire contents of which are incorporated herein by reference.

This application is based upon and claims the benefit of priority from Japanese patent application Nos. 2019-122231, filed on Jun. 28, 2019 and 2020-100057, filed on Jun. 9, 2020, the disclosure of each of which is incorporated herein in its entirety by reference.

TECHNICAL FIELD

The present invention relates to an information processing apparatus suitable for generating an NC program (Numerical Control Program) to be used by a numerical control apparatus that controls processing by a machine tool, an information processing method, and an information processing program.

BACKGROUND ART

Conventionally, an NC program to be used by a numerical control apparatus that controls a measurement function and processing by a machine tool is generated by converting, by a post-processor, cutter location data (to be referred to as "CL data" hereinafter) generated by a so-called computer aided manufacturing device (to be referred to as a "CAM device" hereinafter).

For example, patent literature 1 discloses a technique capable of manufacturing an NC program depending on a different machine tool by automatically developing/optimizing the non-cutting path (positioning path) of CL data.

CITATION LIST

Patent Literature

Patent literature 1: Japanese Patent No. 6438023

SUMMARY OF THE INVENTION

Technical Problem

However, CL data is generated not only in a format standardized in ISO (International Organization for Standardization) but also in a proprietary format different for each CAM manufacturer. Therefore, to convert CL data into an NC program, it is necessary to develop a proprietary post-processor for each CAM device, thereby requiring an enormous cost and time for the development.

A post-processor is generally developed by the manufacturer or store of the CAM device. However, a number of models of machine tools are deployed by each machine tool manufacturer. Therefore, it is difficult for the store of the CAM device to develop a post-processor that can correctly convert various optional functions of each machine tool into NC programs without omission. Thus, even if a useful function is implemented in a machine tool, it may be impossible to convert CL data into an NC program, thereby making it possible to use only a general-purpose function.

Solution to Problem

To solve the problem, the present invention provides an information processing apparatus, an information processing method, and an information processing program described in the appended claims.

Advantageous Effects of Invention

According to the present invention, it is possible to fully utilize the performance of a machine tool by correctly converting CL data output from a CAM device into an NC program.

DESCRIPTION OF EXAMPLE EMBODIMENTS

The first example embodiment of an information processing apparatus, an information processing method, and an information processing program according to the present invention will be described below with reference to the accompanying drawings.

Figure 1:
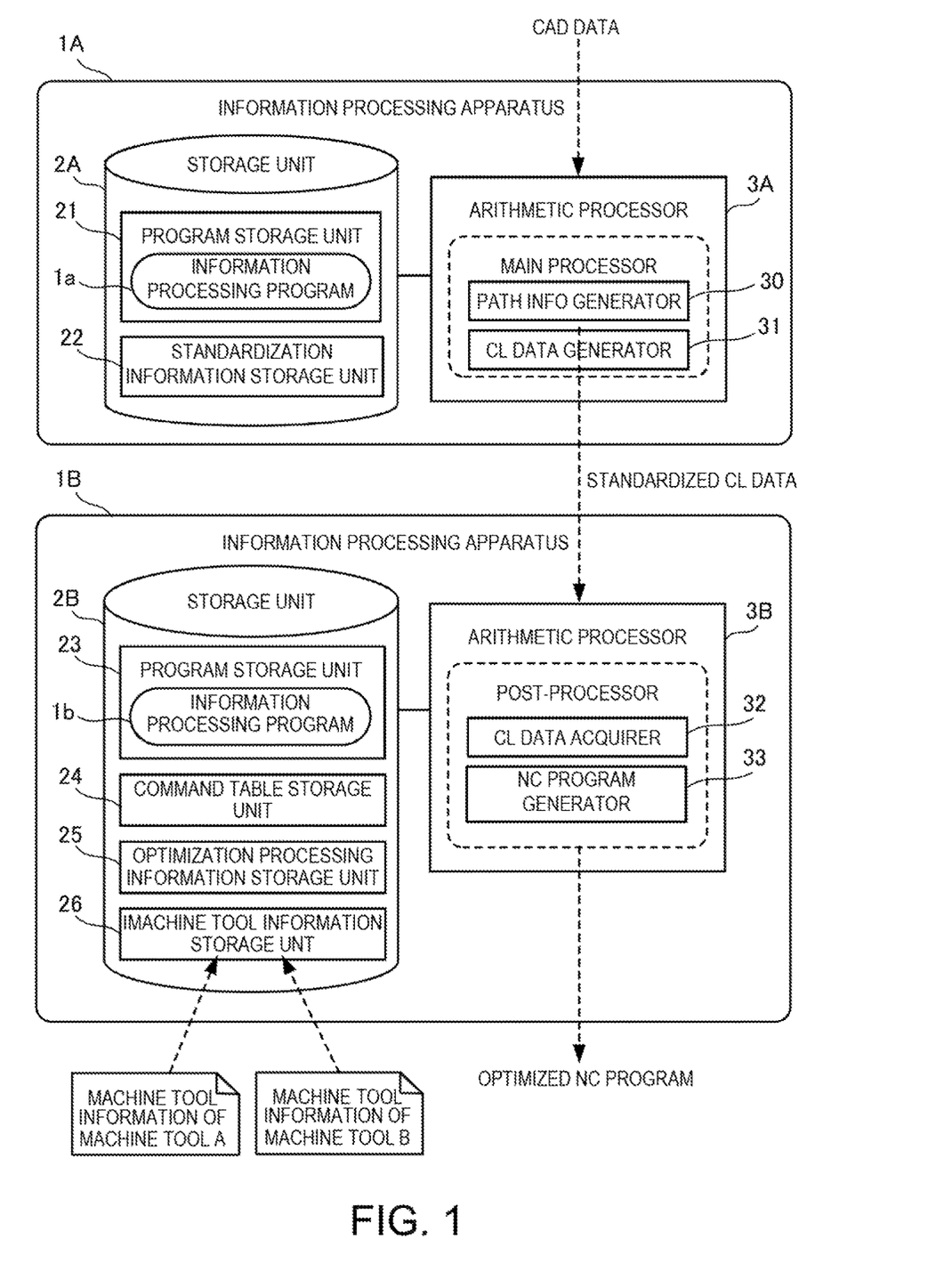
FIG. 1 is a block diagram showing the first example embodiment of an information processing apparatus and an information processing program according to the present invention.

Referring to FIG. 1, a first information processing apparatus 1A generates, from CAD data generated by a computer-aided design device (to be referred to as a "CAD device" hereinafter) 100 or the like, CL data standardized in a predetermined standardized format. Furthermore, a second information processing apparatus 1B generates, based on the CL data output from the first information processing apparatus 1A, an NC program optimized by predetermined optimization processing, and outputs the NC program to a numerical control apparatus that controls a measurement function and processing of a machine tool.

More specifically, the first information processing apparatus 1A is a computer having the function of a so-called CAM device. The first information processing apparatus 1A mainly includes a storage unit 2A that stores various kinds of data and functions as a working area when an arithmetic processor 3A performs various kinds of arithmetic processes, as shown in FIG. 1, and the arithmetic processor 3A that executes various kinds of arithmetic processes by executing an information processing program 1a installed in the storage unit 2A.

Furthermore, the second information processing apparatus 1B is a computer, and mainly includes a storage unit 2B that stores various kinds of data and functions as a working area when an arithmetic processor 3B performs various kinds of arithmetic processes, as shown in FIG. 1, and the arithmetic processor 3B that executes various kinds of arithmetic processes by executing a second information processing program 1b installed in the storage unit 2B. Each component will be described below.

Note that in this example embodiment, the CAD device 100 is a computer in which CAD software is installed, and generates CAD data that defines the three-dimensional shape of a processing object to be processed. Furthermore, examples of the machine tool are an additive manufacturing machine that processes a work by adding a material, a subtractive manufacturing machine that processes a work by removing a material, and a machine that performs processing by emitting light such as a laser beam. More specifically, like a lathe, a drilling machine, a boring machine, a milling machine, a gear cutting machine, a grinding machine, a multi-axis processing machine, a laser processing machine, a laminating machine, and the like, numerical control is performed based on an NC program to perform, for a work made of metal, wood, stone, or a resin, various kinds of processes such as turning, cutting, punching, grinding, polishing, rolling, forging, folding, molding, micromachining, and laminating. Furthermore, some machine tools have a measurement function, and are configured to measure the dimensions and the like of a work using a measuring instrument such as a touch probe or camera.

Each of the storage units 2A and 2B may be a hard disk, a ROM (Read Only Memory), a RAM (Random Access Memory), a flash memory, or the like. As shown in FIG. 1, the storage unit 2A includes a program storage unit 21 and a standardization information storage unit 22. The storage unit 2B includes a program storage unit 23, a command table storage unit 24, an optimization processing information storage unit 25, and a machine tool information storage unit 26.

In the program storage unit 21, the information processing program 1a for controlling the first information processing apparatus 1A of this example embodiment is installed. Then, when the arithmetic processor 3A executes the information processing program 1a, a computer serving as the first information processing apparatus 1A is made to function as each component (to be described later), and to execute each step (to be described later). In the program storage unit 23, the information processing program 1b for controlling the second information processing apparatus 1B of this example embodiment is installed. Then, when the arithmetic processor 3B executes the information processing program 1b, a computer serving as the second information processing apparatus 1B is made to function as each component (to be described later), and to execute each step (to be described later).

Note that the usage modes of the information processing programs 1a and 1b are not limited to the above ones. For example, each of the information processing programs 1a and 1b may be stored in a non-transitory computer-readable recording medium such as a CD-ROM or a USB memory, and may then be read out directly from the recording medium and executed. Alternatively, the information processing program may be used from an external server or the like by a cloud computing method, an ASP (Application Service Provider) method, or the like.

The standardization information storage unit 22 stores standardization information such as a standardized format for standardizing CL data. The CL data is control information for defining a process up to processing of a target work by a toolpath and the like, and general control information is defined in ISO (ISO 4343:2000). Control targets of a machine defined in ISO are NC control of an axis position, a feed rate, and the like, and PLC (Programmable Logic Controller) control of grasping of a work, ON/OFF of a coolant, and the like. These are basic control commands common to any machines.

On the other hand, in this example embodiment, when generating an NC program for a machine tool, in addition to the control information included in the CL data, (a) "unique control information of the numerical control apparatus" independently implemented by the numerical control apparatus manufacturer of the machine tool, (b) "unique control information of the machine tool" independently implemented by the machine tool manufacturer, and (c) "unique control information of the user of the machine tool" independently implemented by the user of the machine tool can be used, and a unique control command including these pieces of unique control information can be output as a standard.

Examples of the unique control information of the numerical control apparatus are as follows.
(1) The model number (example: RPFK) of the numerical control apparatus
(2) The custom macro of the numerical control apparatus manufacturer
Examples: tapping cycle (TAP)
G84XYZRPFK (manufacturer A)
G84XYZPF, R00, I, J, L (manufacturer B)
Examples of the unique control information of the machine tool are as follows.
(1) The model number (example: MORI) of the machine tool
(2) The custom macro of the machine tool manufacturer
Example: macro (G432 or the like) concerning a drill corresponding to the model number of the machine tool
Examples of the unique control information of the user of the machine tool are as follows.
(1) Drilling cycle pattern (example: CYCLE)
(2) The custom macro of the user of the machine tool
Example: macro (G65P1000 or the like) having a correspondence with the drilling cycle pattern (CYCLE)

For each piece of unique control information, standardization information such as a standardized format for standardizing the specifications, which is based on a rule defined among a plurality of output devices such as CAM and NC devices, is prepared in advance in the standardization information storage unit 22. That is, in this example embodiment, the unique control information is information such as the custom macro and processing step information other than information defined in ISO 4343:2000 defined on Oct. 15, 2000.

Note that the custom macro as one of the above-described pieces of unique control information is a program for expanding the above-described G code or M code, and allows each of the numerical control apparatus manufacturer of the machine tool, the machine tool manufacturer, and the user of the machine tool to independently implement a unique function (Gxx, Gxy, Mxx, Mxy, or the like). Depending on the type of the work and a processing method, an NC program for calling the custom macro need only be generated.

The processing step information as one of the above-described pieces of unique control information is not directly related to control of the machine tool, and is additional information for grasping various kinds of processing information and process control by an HMI (Human Machine Interface) and implementing a function targeting improvement in work efficiency and traceability. Furthermore, the HMI is an application program for operating the machine tool or that for monitoring the state of the machine tool, and can also be mounted on a tablet, a smartphone, or the like. Therefore, the operability of the machine tool is improved by visualizing various kinds of data in the HMI.

Note that (a) the unique control information of the numerical control apparatus, (b) the unique control information of the machine tool, and (c) the unique control information of the user of the machine tool are not always required. Depending on the kind of the work and the processing method, an NC program may be generated in consideration of at least one or two of the pieces of unique control information.

The standardized format as one piece of standardization information includes a command name and an argument that can be designated by the command, and is defined in advance in the standardization information storage unit 22. For example, an argument "FIN" indicating finishing processing and an argument "ROUGH" indicating rough processing are defined for a command "PROCMOD" indicating a measurement function.

The command table storage unit 24 stores a command table representing the correspondence between the command and argument of the standardized format and the command (NC code) of the NC program. A more detailed description will be provided later in Example 1. However, for an extension by the user, as will be described later in Example 2, only a command and an argument are defined in advance in a command table while a corresponding NC code is blank (reserved state), and the NC code may additionally be implemented in the command table when calling an arbitrary program.

The optimization processing information storage unit 25 stores optimization processing information concerning optimization processing to be performed for the NC program. In this example embodiment, as the optimization processing information, information, a processing operation, and the like necessary to execute the NC code corresponding to the optimization processing are stored. Note that in this example embodiment, the optimization processing is a concept including all processes that provide benefits to machining, such as saving of the processing time, improvement of the processing accuracy, saving of power and a coolant, efficient removal of chips, and improvement in efficiency by visualizing process control. More specifically, examples of the optimization processing are (1) to (4) below but the present invention is not limited to them.

(1) Optimization of Servo Characteristic

If processing modes of (a) to (d) below are implemented by the custom macro, it is possible to optimize the processing accuracy and processing time by designating a desired processing mode.

(a) Time priority mode: A mode of giving a highest priority to saving of the processing time. This is used when the required accuracy is low, like rough processing.

(b) Intermediate mode: A mode between the time priority mode and an accuracy priority mode. This is used for finishing processing and the like when high accuracy and a short time are required.

(c) Accuracy priority mode: A mode of prioritizing improvement of the processing accuracy. This is used when the processing accuracy or a finishing surface is required.

(d) Accuracy top priority mode: A mode of prioritizing the processing accuracy more than the accuracy priority mode.

(2) Automatic Optimization of Servo Characteristic

If a function of automatically adjusting the servo is implemented by the PLC, the mass and moment of inertia of the work or jig are measured and the optimum acceleration/deceleration is set based on the feedback values. More specifically, if the mass of the work or jig is large and the moment of inertia is large, the acceleration/deceleration is suppressed, thereby implementing stable positioning. On the other hand, if the mass of the work or jig is small and the moment of inertia is small, the acceleration/deceleration is maximized, thereby saving the processing time.

(3) Optimization of ON/OFF Control of Chip Conveyor

If the ON/OFF function of the chip conveyor that discharges chips is implemented by the PCL, the volume of chips with time is calculated by a processing simulation, and ON/OFF control of the chip conveyor is optimized in accordance with the amount of the chips. More specifically, by turning off the chip conveyor during non-cutting or a time period in which the amount of the chips is small, the driving power of the chip conveyor is saved and the use efficiency of a cutting fluid is improved.

(4) Optimization of Process Control

If a function of tagging, with a common processing step ID, the same processing among the CAM device, the post-processor, and the NC viewer of the HMI of the machine tool is implemented, the CAM device, the post-processor, and the NC viewer of the HMI of the machine tool can share the processing step, and thus the following functions can be implemented to optimize the process control.

A function of displaying or updating changes in a post-process

A function of highlighting changes when operating the machine tool

A function of stopping by the intermediately preceding positioning command

A function of updating changes in a preprocess when only numerical values such as a feed rate and a main shaft rotational frequency are changed The machine tool information storage unit 26 stores machine tool information as information concerning various machine tools whose machine tool manufacturers or models are different. In this example embodiment, the machine tool information indicates a machine origin, a model stroke length, the G code of a machine-specific command, the M code (Mxx, Mxy), and the like, and may include the following information.

(1) The model number of the machine tool
(2) Optional information (the number of turrets, a main shaft diameter, a servo, the type and presence/absence of the chip conveyor, and the type and presence/absence of the measuring instrument)
(3) Usable tool types (examples: drill and endmill)
(4) The number of pots and a pot number in a magazine As shown in FIG. 1, the machine tool information concerning various machine tools whose machine tool manufacturers or models are different can be input from the outside or the like to the machine tool information storage unit 26.

Next, the arithmetic processor 3A is formed by a CL generation processor, and executes the information processing program 1a installed in the storage unit 2A to function as a path generation information generator 30 and a CL data generator 31, as shown in FIG. 1. Furthermore, the arithmetic processor 3B is formed by the post-processor, and executes the second information processing program 1b installed in the storage unit 2B to function as a CL data acquirer 32 and an NC program generator 33. Each component will be described below.

The path generation information generator 30 generates path generation information such as a feed rate and a tool orientation with respect to a surface. In this example embodiment, the path generation information generator 30 generates path generation information from CAD data acquired from the CAD device 100.

The CL data generator 31 generates CL data by standardizing CL data representing the path of the tool with respect to the work. In this example embodiment, the CL data generator 31 generates CL data based on the path generation information generated by the path generation information generator 30. Next, the CL data generator 31 specifies unique control information included in the CL data, and reads out the standardized format corresponding to the unique control information from the standardization information storage unit 22. Then, the CL data generator 31 outputs CL data labeled with the standardized format corresponding to the unique control information.

Note that in this example embodiment, the CL data generator 31 generates CL data and then standardizes it. However, the present invention is not limited to this, and standardized CL data may be generated at once. The standardization information is not limited to the standardized format, and any information based on the rule defined among the plurality of output devices such as CAM and NC devices is possible. In this case, the CL data generator 31 generates CL data including standardization information.

Figure 2:
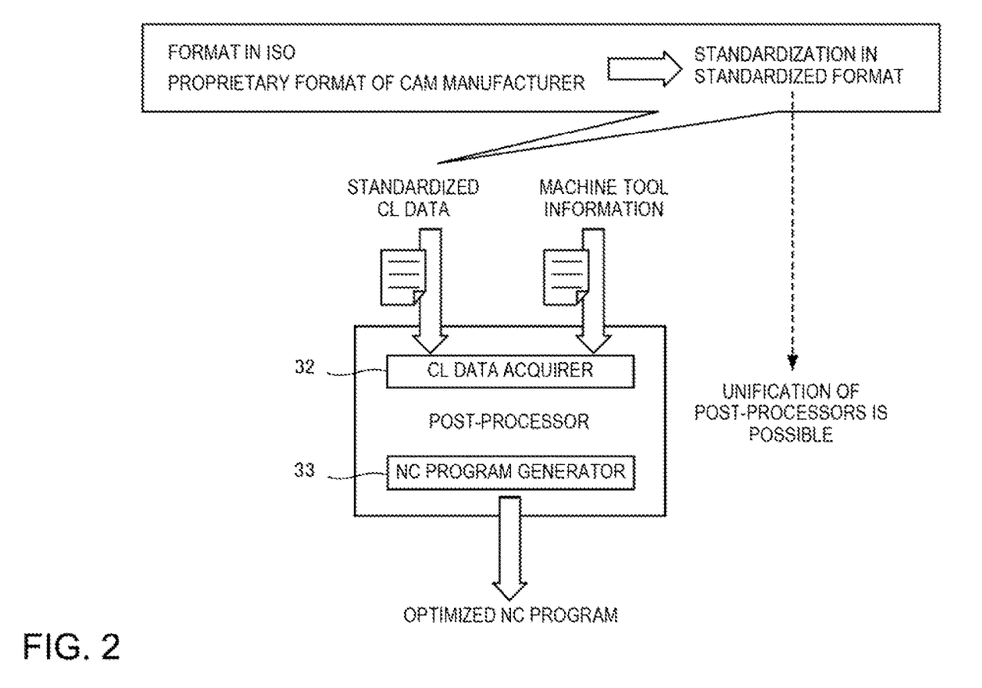
FIG. 2 is a view showing the function of a post-processor according to the first example embodiment.

The CL data acquirer 32 can acquire CL data including standardization information. In this example embodiment, as shown in FIG. 2, the CL data acquirer 32 acquires CL data that is the CL data generated by the CL data generator 31 and includes standardization information associated with at least one of (a) the unique control information of the numerical control apparatus, (b) the unique control information of the machine tool, and (c) the unique control information of the user of the machine tool.

The NC program generator 33 generates an NC program optimized based on the CL data including the standardization information. In this example embodiment, as shown in FIG. 2, the NC program generator 33 loads the standardization information such as the standardized format included in the CL data acquired by the CL data acquirer 32, and acquires the NC code corresponding to the standardization information from the command table. Then, the NC program generator 33 generates an NC program including the NC code based on the NC code and the CL data. Furthermore, the NC program generator 33 acquires machine tool information unique to each machine tool from the machine tool information storage unit 26, and generates an NC program using the acquired machine tool information unique to each machine tool.

Furthermore, in this example embodiment, the NC program generator 33 may read out the optimization processing information corresponding to the NC code from the optimization processing information storage unit 25, and generate an optimized NC program based on the optimization processing information and the machine tool information.

Next, the effects of the information processing apparatus, the information processing method, and the information processing program of this example embodiment will be described.

Figure 3:
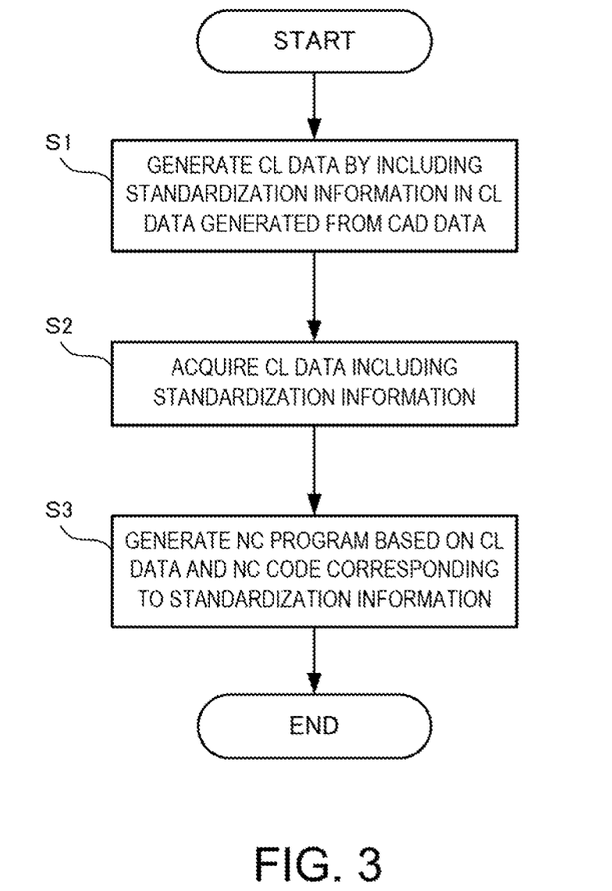
FIG. 3 is a flowchart illustrating processing steps executed according to the first example embodiment.

When creating an NC program from CAD data using the information processing method executed by the first information processing apparatuses 1A and 1B and the information processing programs 1a and 1b of this example embodiment, the CL data generator 31 formed by the CL generation processor first generates CL data by including standardization information in CL data generated from CAD data, as shown in FIG. 3 (step S1: CL data generation step). This outputs, to the post-processor, the CL data unique to the first information processing apparatus 1A and standardized with respect to not only NC control and PLC control corresponding to the functions standardized in ISO but also unique control information which is not standardized in ISO in control information included in CL data in which the processing process of the work is described.

Next, the CL data acquirer 32 formed by the post-processor acquires the CL data including the standardization information (step S2: CL data acquisition step). This obtains the standardization information associated with at least one of (a) the unique control information of the numerical control apparatus, (b) the unique control information of the machine tool, and (c) the unique control information of the user of the machine tool.

Subsequently, the NC program generator 33 formed by the post-processor generates an NC program based on the CL data and the NC code corresponding to the standardization information (step S3: NC program generation step). Conventionally, for a different CAM device, the control format of the machine tool manufacturer other than that defined in ISO does not exist or is different, and it is thus necessary to individually prepare a post-processor. To the contrary, by preparing a post-processor that can process the standardization information, CL data output from any CAM device is correctly converted into an NC program by performing standardization in the standardized format. Therefore, it is possible to use various optional functions of the machine tool without omission in consideration of the characteristics of the machine tool, thereby fully utilizing the performance of the machine tool. In addition, it is unnecessary to prepare a post-processor for each different machine tool, and it is possible to unify post-processors, thereby reducing the development cost and time taken for development.

In this example embodiment, when generating an NC program, the NC program generator 33 generates an optimized NC program based on the optimization processing information and the machine tool information. This optimizes various processes and settings in machining, thereby implementing saving of the processing time, improvement of the processing accuracy, saving of power and a coolant, efficient removal of chips, improvement in efficiency by visualizing process control, and the like.

As described above, since the post-processor is conventionally different for each CAM device, the optimization function of executing optimization processing is implemented in the CL generation processor or the numerical control apparatus. To the contrary, in this example embodiment, since it is possible to standardize CL data in the standardized format and integrate the optimization function in the post-processor by unify post-processors, the efficiency of development of the whole system is improved. Furthermore, a personal computer can often use the latest CPU, as compared with the numerical control apparatus, and often has high performance. Therefore, by implementing, in a post-processor formed from a personal computer or the like, a function conventionally implemented in the numerical control apparatus, improvement of the processing speed can be expected.

Furthermore, although the machine tool originally has various kinds of optional functions, it is not possible to effectively use all the optional functions by a conventional NC program. To the contrary, with respect to the optimized NC program of this example embodiment, an NC program that sufficiently considers the characteristics of the machine tool and utilizes the various optional functions of the machine tool without omission is output to the machine tool, thereby fully utilizing the performance of the machine tool.

Figure 5:
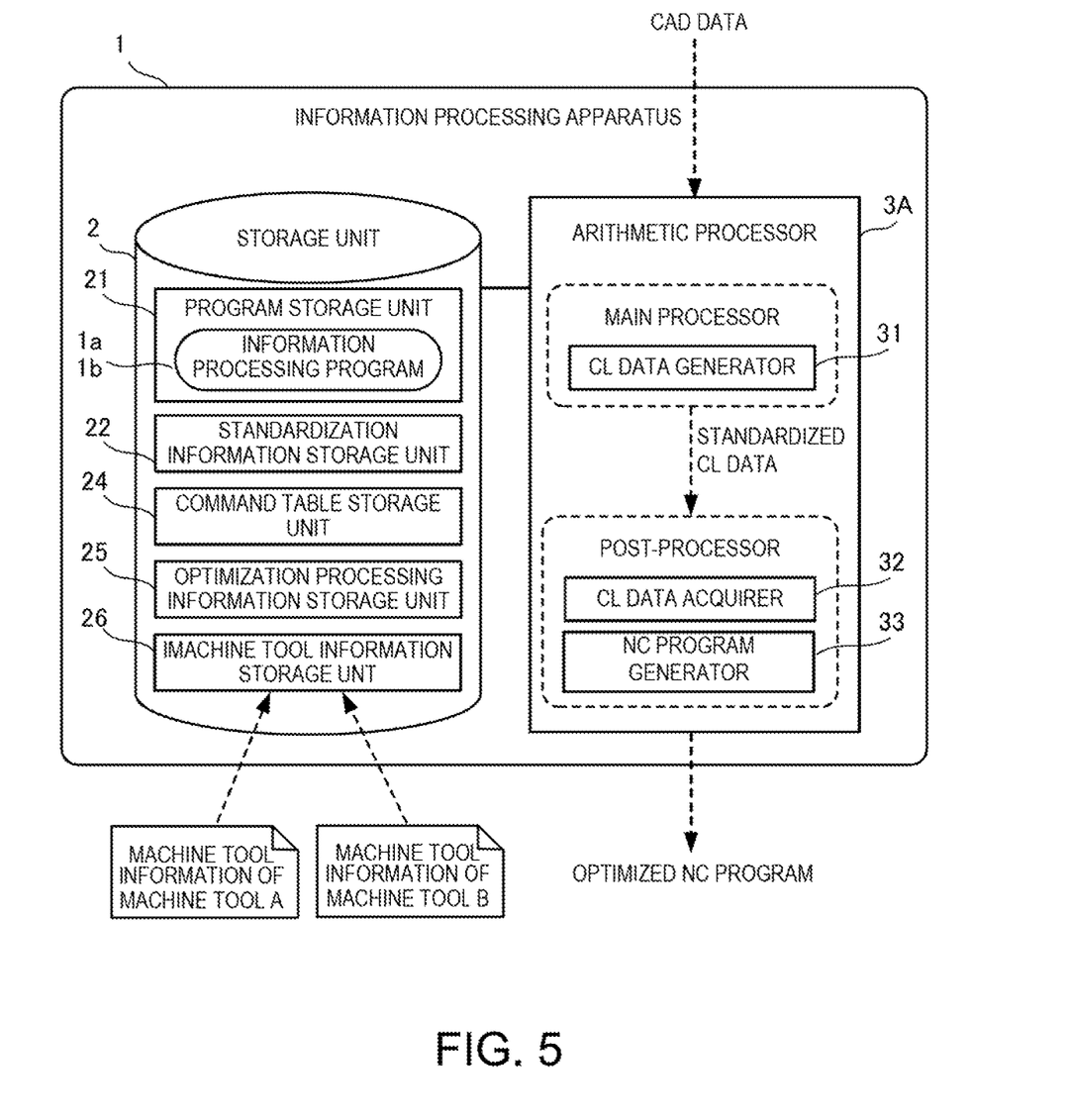
FIG. 5 is a block diagram showing the second example embodiment of an information processing apparatus and an information processing program according to the present invention.

Note that the information processing apparatus, the information processing method, and the information processing program according to the present invention are not limited to the above-described example embodiment, and changes can be made appropriately. For example, although the first information processing apparatus 1A and the second information processing apparatus 1B are separately formed in the above-described example embodiment, these information processing apparatuses may be formed as an integrated information processing apparatus 1, as shown in FIG. 5.

In the above-described example embodiment, the first information processing apparatus 1A is formed by the CAM device but the present invention is not limited to this. That is, the first information processing apparatus 1A may be formed by a CAD/CAM device having the function of the CAD device 100 and the function of the CAM device. That is, for commercialization, the CAD device 100, the first information processing apparatus 1A, and the second information processing apparatus 1B can arbitrarily be combined into one apparatus or one application program, and can then be provided to a user.

Furthermore, the functions of the first information processing apparatus 1A and the second information processing apparatus 1B of this example embodiment may be implemented in a machine tool. Thus, since the machine tool receives CL data, a plurality of machine tools whose numerical control apparatuses are different can share common CL data. If the machine tool receives CAD data, it can generate CL data including standardization information and generate/process an optimized NC program. Furthermore, in this example embodiment, data obtained by describing standardization information in CL data is used as a standardized CL data but the present invention is not limited to this. For example, data obtained by including two data of CL data in a CL data format and standardization information in an XML format may be used as standardized CL data.

In the above-described example embodiment, the command table is stored in the command table storage unit 24 of the storage unit 2B. However, information machine-learned by an external machine learning device may be stored instead of the command table. Alternatively, a machine learning method may be stored in the storage unit 2B.

Furthermore, in the above-described example embodiment, the CAM device serving as the first information processing apparatus 1A labels the CL data with the standardized format but the present invention is not limited to this. The post-processor serving as the second information processing apparatus 1B may execute labeling. In this case, as shown in FIG. 6, CL data without the standardized format is output from the CAM device and the post-processor first receives the CL data.

Figure 6:
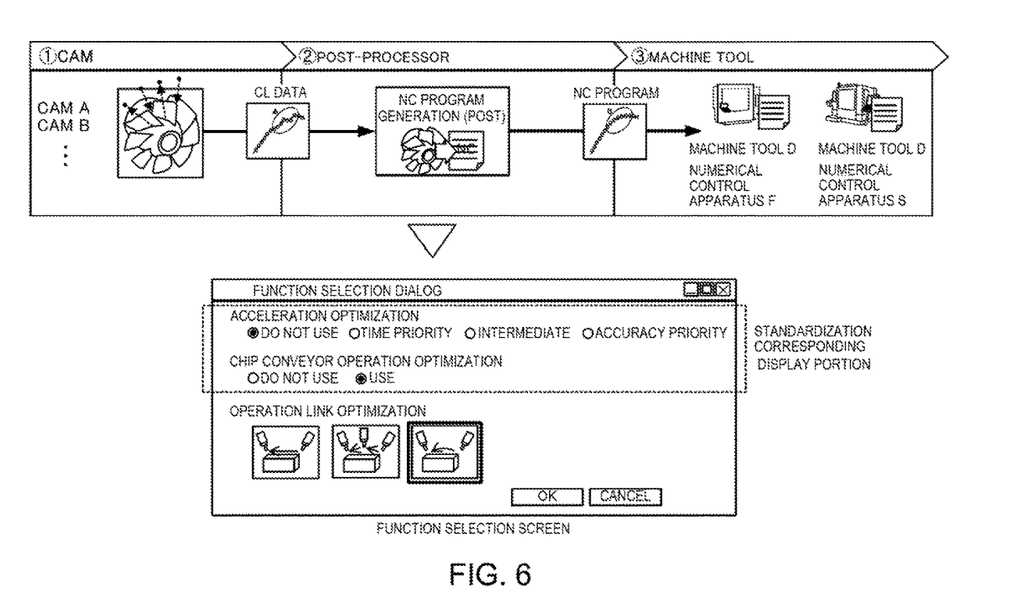
FIG. 6 is a view showing the third example embodiment of an information processing apparatus and an information processing program according to the present invention.

The post-processor displays, for the received CL data, a function selection screen shown in FIG. 6 on a display device such as a display, thereby making it possible to select optimization processing on the function selection screen. Then, if the optimization processing selected by the user is executed, the post-processor applies the label of the standardized format to the CL data without the standardized format, thereby generating standardized CL data. Furthermore, after the standardized CL data is generated, the post-processor converts the standardized CL data into an NC program, and outputs it to the machine tool.

In addition, the post-processor may receive standardized CL data output from the CAM device, and select optimization processing on the above-described function selection screen. In this case, the post-processor outputs an NC program having undergone the optimization processing selected on the function selection screen different from the standardization information. The post-processor may output the NC program together with an NC program having undergone the optimization processing based on the standardization information of the standardized CL data.

Note that by selecting icons of standardization buttons surrounded by a dotted line as a standardization corresponding display portion of the function selection screen (function selection dialog) shown in FIG. 6, the data is converted into an NC program corresponding to the contents of the selected icons.

In the above-described example embodiment, the CL data output from the CAM device serving as the first information processing apparatus 1A includes data concerning a movement (operation link) connecting operations. However, depending on the model of the CAM device, the output CL data may not include such data.

To cope with this, the post-processor serving as the second information processing apparatus 1B may have a function of including a path connecting operations. For example, the post-processor can display a function selection screen shown in FIG. 7, prompt the user to select an appropriate path from path candidates of some operation links, and generate CL data including the selected path. With this arrangement, the user can use an optimum path generation function regardless of the model of the CAM device. Furthermore, the post-processor generates an NC program reflecting the selected path. Note that an output for generating a path can be implemented by only a common G code such as G0 or G1 defined in ISO, and need not be defined in the standardized format.

Figure 7:
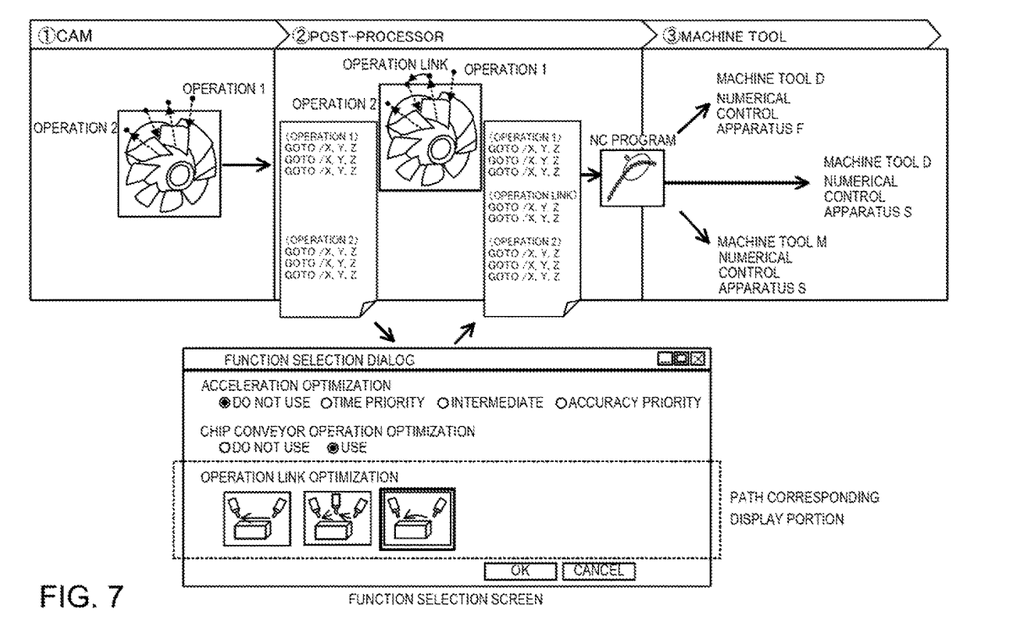
FIG. 7 is a view showing the fourth example embodiment of an information processing apparatus and an information processing program according to the present invention.

Note that by selecting an icon of a path addition button surrounded by a dotted line as a path corresponding display portion of the function selection screen (function selection dialog) shown in FIG. 7, the data is converted into an NC program corresponding to the contents of the selected icon.

Next, practical examples of the information processing apparatus, the information processing method, and the information processing program according to the present invention will be described.

Example 1

In Example 1, a simulation of optimizing an NC program to correspond to the standard function of a machine tool was performed. As the standard function, a function of measuring a maximum acceleration at the time of prototype processing and controlling an acceleration not to exceed the maximum acceleration in the processing was selected. The processing roughly includes two kinds of processes of rough processing (ROUGH) and finishing processing (FIN), and there is a demand for limiting an acceleration measurement target to finishing processing.

Figure 8:
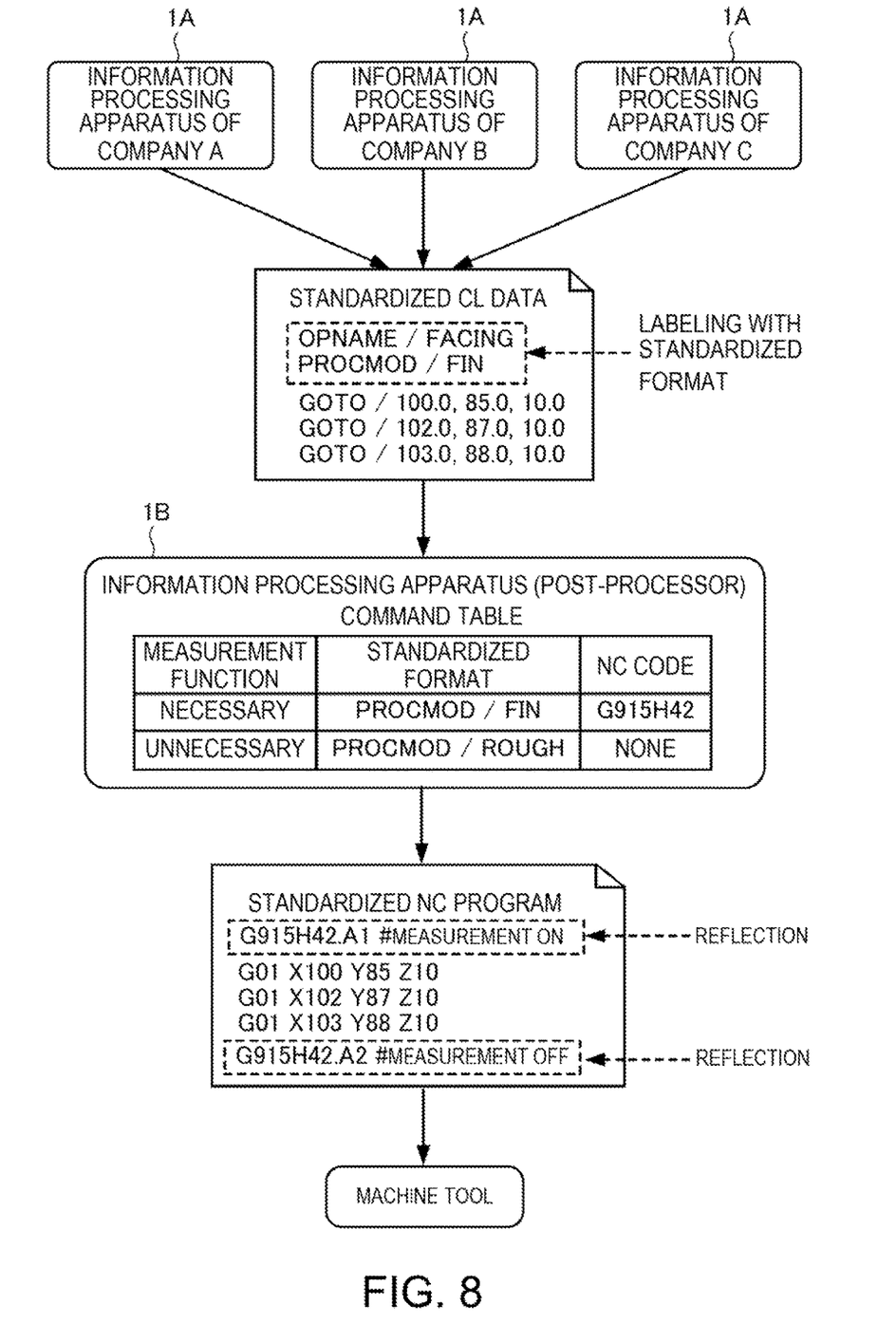
FIG. 8 is a view for explaining processing of Example 1.

To cope with this, in Example 1, as shown in FIG. 8, each of the CAM devices of companies A, B, and C was provided with a CL data generation function according to the present invention to serve as a first information processing apparatus 1A. When each first information processing apparatus 1A was made to load CAD data, it output CL data labeled with a standardized format (PROCMOD/FIN) for designating finishing processing.

Next, as shown in FIG. 8, a second information processing apparatus 1B (post-processor) that received the CL data output from each first information processing apparatus 1A read out an NC code (G915H42) corresponding to the standardized format (PROCMOD/FIN) based on a command table, and automatically reflected the NC code on an NC program and output the NC program as an optimized NC program.

When the machine tool was controlled using the optimized NC program, it was programmed to automatically turn on a measurement function only at the time of finishing processing and automatically turn off the measurement function at the time of rough processing.

According to Example 1 described above, the following effects are obtained.

Figure 4:
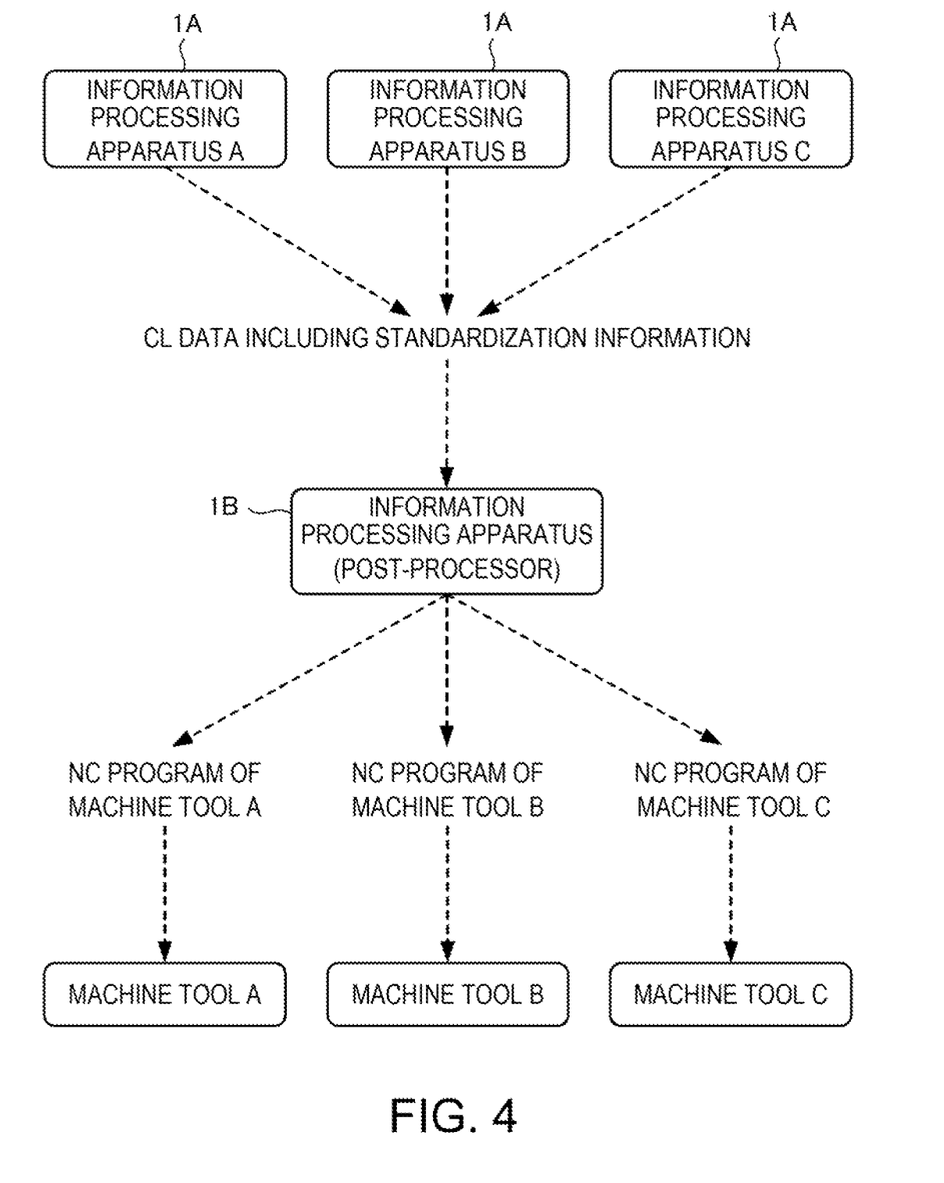
FIG. 4 is a view showing an effect according to the first example embodiment.

1. Since even CL data output from any CAM device (first information processing apparatus 1A) can be converted into an NC program easily and correctly, as shown in FIG. 4, it is possible to use various optimization functions specified by unique control information regardless of the CAM device.

2. Since post-processors are unified to convert various CL data, the optimization function can be integrated in the post-processor, thereby improving the efficiency of development of the whole system.

3. It is possible to generate an NC program using various optional functions of the machine tool without omission by sufficiently considering the characteristics of the machine tool, thereby fully utilizing the performance of the machine tool.

4. It is unnecessary to prepare a post-processor for each model of the tool machine unlike the conventional technique, and one post-processor can generate NC programs for a plurality of machine tools, as shown in FIG. 4, thereby reducing the development cost and time taken for development of a post-processor.

Furthermore, according to Example 1, even for CL data output from a different first information processing apparatus 1A, if the CL data is standardized in the standardized format, the second information processing apparatus 1B can optimize an NC program to correspond to the standard function of the machine tool.

Example 2

Next, in Example 2, a simulation of optimizing an NC program to correspond to an extension by the user was performed. More specifically, as a standard function to be expanded, a high-speed deep hole drilling cycle (G73) among G-code fixed cycles was selected. In this drilling processing, there is a demand for using a custom macro for drilling generated by the user himself/herself instead of normal drilling of the standard function.

Figure 9:
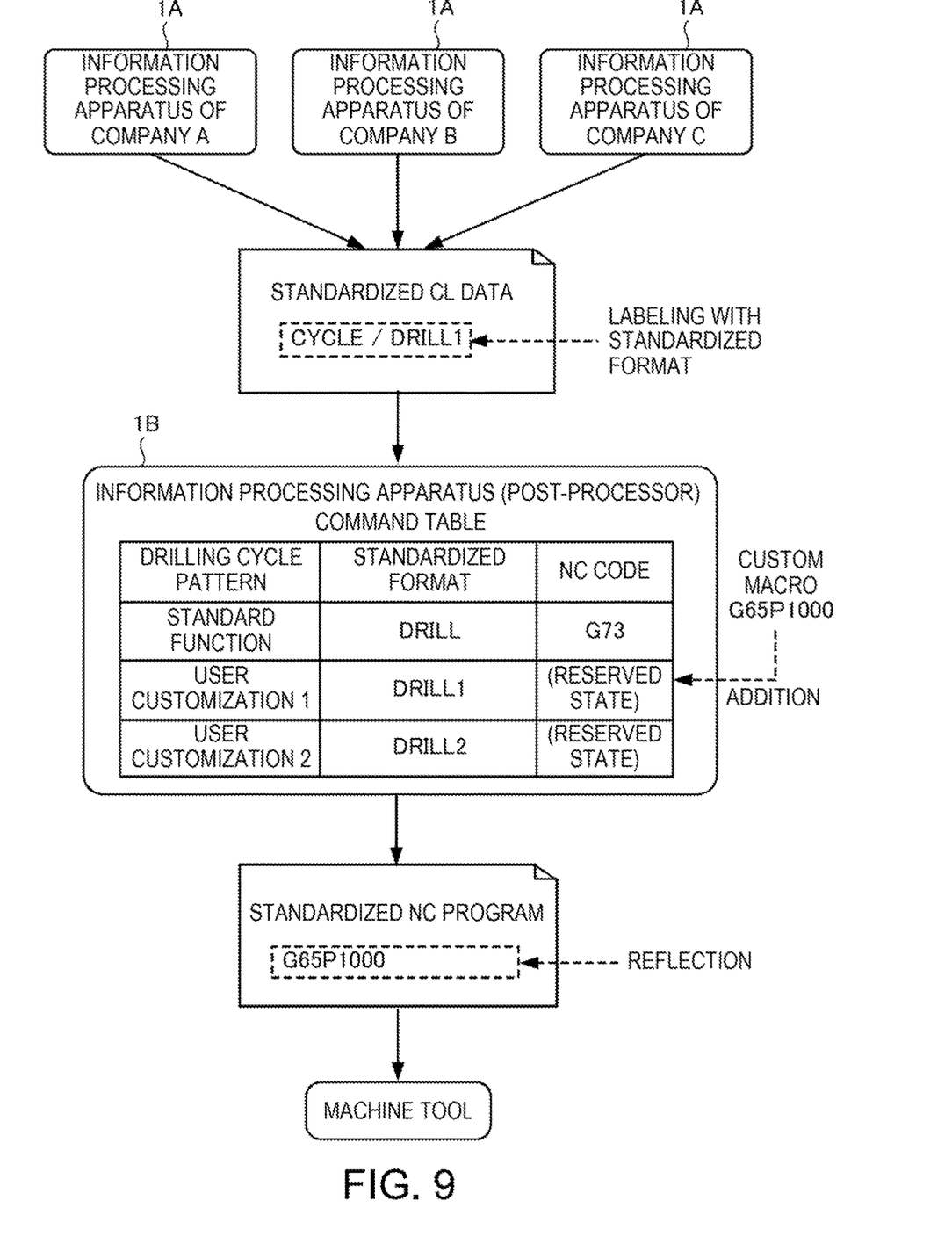
FIG. 9 is a view for explaining processing of Example 2.

To cope with this, in Example 2, as shown in FIG. 9, standardized formats such as "DRILL1" and "DRILL2" for instructing expansions by the user were defined in advance in a command table, and corresponding NC codes were blank (reserved state). Then, a custom macro (G65P1000) to be called was additionally implemented in the blank corresponding to "DRILL1".

After that, similar to Example 1 described above, when each first information processing apparatus 1A having a CL data generation function was made to load CAD data, it output CL data labeled with the standardized format "CYCLE/DRILL1" for designating an expansion.

Next, as shown in FIG. 9, a second information processing apparatus 1B (post-processor) that received the CL data output from each first information processing apparatus 1A read out the NC code (G65P1000) corresponding to the standardized format based on the command table, and automatically reflected the NC code on an NC program and output the NC program as an optimized NC program.

When the machine tool was controlled using the optimized NC program, it was programmed to call the custom macro created by the user to execute drilling processing.

According to Example 2 described above, even for CL data output from a different first information processing apparatus 1A, the second information processing apparatus 1B can associate an NC code corresponding to the custom macro with the standardized format, thereby optimizing an NC program to correspond to the expansion by the user.

Figure 10:
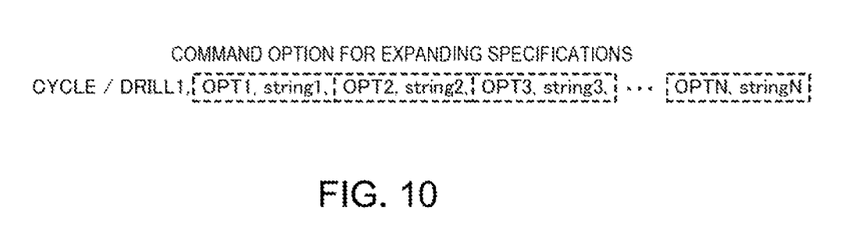
FIG. 10 is a view showing an example of a command option for expanding specifications according to Example 2.

Note that in the above-described expansion, a command option for further expanding the specifications may be added. More specifically, as shown in FIG. 10, "OPT1, string1", "OPT2, string2", . . . , "OPTN, stringN" for designating command options are defined in association with the standardized format "CYCLE/DRILL1".

Then, the user freely assigns an interpretation, for example, assigns a hole diameter to OPT1 and a hole depth to OPT2, and passes a value corresponding to each option to "stringX". According to the above-described specification example, it is possible to designate a drilling command of a hole diameter of 8 and a hole depth of 12, as follows.

CYCLE/DRILL1, OPT1, 8, OPT2, 12

With the above arrangement, it is possible to deal with any individual requests of users by defining in advance a number of options and general-purpose names.

Note that the above description of the example embodiment and examples is merely an example in terms of all the points and does not limit the present invention, and those skilled in the art can make modifications and changes appropriately. The scope of the present invention is indicated not by the above-described example embodiment and examples but by the scope of claims. Furthermore, the scope of the present invention includes changes from the example embodiment within a scope equivalent to the scope of claims.

The invention claimed is:

1. An information processing apparatus for generating an NC program to be used by a numerical control apparatus for controlling processing by a machine tool, comprising:
   at least one processor; and
   a memory storing instructions that, when executed by the at least one processor, cause the information processing apparatus to:
   acquire CL data including standardization information based on a rule defined among a plurality of output devices that output CL data, the standardization information being associated with unique control information of the machine tool including a custom macro of the machine tool manufacturer; and
   acquire an NC code corresponding to the custom macro of the machine tool manufacturer associated with the standardization information included in the acquired CL data; and
   generate an NC program including the NC code based on the NC code and the CL data.

2. An information processing method of generating an NC program to be used by a numerical control apparatus for controlling processing by a machine tool, comprising:
acquiring CL data including standardization information based on a rule defined among a plurality of output devices that output CL data, the standardization information being associated with unique control information of the machine tool including a custom macro of the machine tool manufacturer; and
acquiring an NC code corresponding to the custom macro of the machine tool manufacturer associated with the standardization information included in the acquired CL data; and
generating an NC program including the NC code based on the NC code and the CL data.

3. An information processing apparatus for generating an NC program to be used by a numerical control apparatus for controlling processing by a machine tool, comprising:
at least one processor; and
a memory storing instructions that, when executed by the at least one processor, cause the information processing apparatus to:
acquire CL data including standardization information based on a rule defined among a plurality of output devices that output CL data, the standardization information being associated with unique control information of the machine tool including a custom macro of a user of the machine tool;
acquire an NC code corresponding to the custom macro of the user of the machine tool associated with the standardization information included in the acquired CL data; and
generate an NC program including the NC code based on the NC code and the CL data.

* * * * *